UNITED STATES PATENT OFFICE.

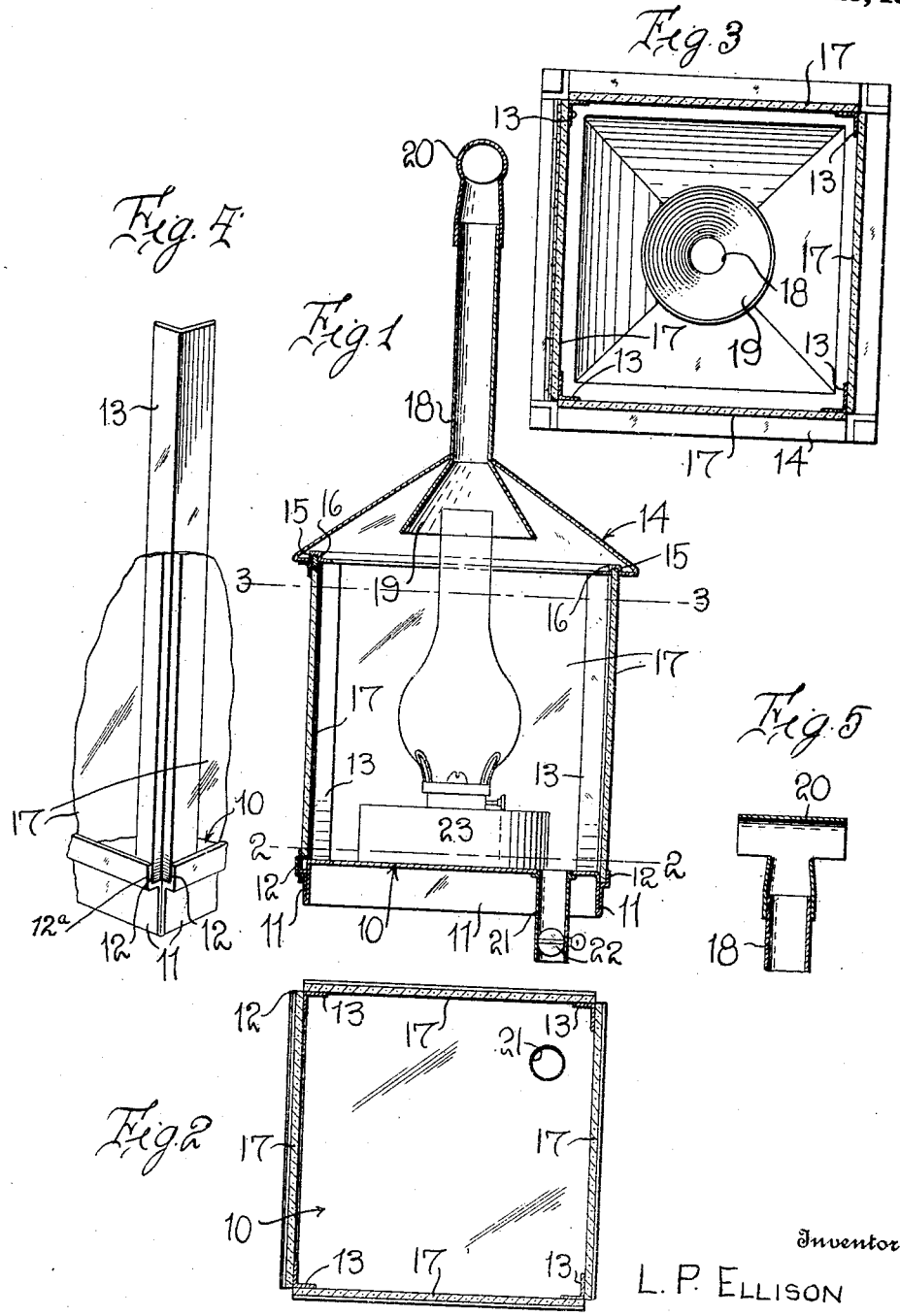

LENARD P. ELLISON, OF CULLMAN, ALABAMA.

LAMP-HOUSING.

1,366,370. Specification of Letters Patent. Patented Jan. 25, 1921.

Application filed July 31, 1916, Serial No. 112,355. Renewed June 26, 1920. Serial No. 392,045.

*To all whom it may concern:*

Be it known that I, LENARD P. ELLISON, a citizen of the United States, residing at Cullman, in the county of Cullman and State of Alabama, have invented certain new and useful Improvements in Lamp-Housings, of which the following is a specification, reference being had to the accompanying drawings.

This invention relates to lamps and lanterns and more particularly to a housing designed to contain and form a casing for an ordinary lamp.

This invention has for its object to so construct the housing of a lamp that the glass panels forming the sides of the housing may be readily withdrawn from engagement with the frame of the lamp and independently of each other, either to insert the lamp or for the purpose of cleaning or to replace a broken panel with a new panel.

Other objects will appear in the course of the following description.

My invention is illustrated in the accompanying drawings, wherein:

Figure 1 is a vertical sectional view through a lamp housing constructed in accordance with my invention;

Fig. 2 is a section on the line 2—2 of Fig. 1;

Fig. 3 is a section on the line 3—3 of Fig. 1 looking upward;

Fig. 4 is a fragmentary perspective view showing a corner of the lamp housing; and Fig. 5 is a vertical sectional view through the upper end of the flue 18 and the cap 20.

Referring to these figures, 10 designates the bottom of the housing which is preferably made of sheet metal such as galvanized iron and which is formed at its edges with downwardly extending flanges 11 which are then returned upon themselves as at 12 so as to form a channel or gutter. The bottom of the lamp housing is shown as square and at the four corners thereof are provided the corner pieces 13 which are angular in cross section and which may be likewise formed of sheet metal and supported upon these corner pieces is the roof 14 which is made of sheet metal, this roof being downwardly and outwardly extended beyond the plane of the outer faces of the corner pieces and then rebent upward as at 15 and then downward as at 16 so as to form a channel corresponding and facing the channel formed at the bottom of the housing. The material at the ends of each channel is cut away as at 12$^a$ to thereby prevent the channels from intersecting each other and permit panes of glass to be readily inserted. In these channels are slidably disposed the sheets of glass 17 which form the four sides of the housing. One of the sides of the lamp housing is formed of a hinged frame constituting the door of the housing, this frame having channels for a glass pane.

The roof extends upward and centrally in a pyramidal form and passing through the apex of the pyramidal roof is a flue or stack 18, which at its inner end terminates in a cone 19 disposed within the pyramidal roof. The upper end of the stack or chimney 18 is provided with a cap 20 having oppositely disposed openings through which the products of combustion can escape. In order to supply air to the housing I provide the floor or base 10 with an inlet pipe 21 having a damper 22.

In the practical use of my invention a lamp 23 is disposed within the housing and rests upon the bottom thereof so that the products of combustion given off by the lamp will pass upward into the cone 19 and then outward through the chimney or flue 18. In practical use it has been found that a lamp housing of this character is extremely effective. The light is fully shielded from blasts of wind even of the most violent character and from rain. The light will burn steadily and evenly within the housing, because a sufficiency of air is provided through the inlet 21 without too much air being allowed to enter the housing. The damper may be regulated so as to prevent sudden blasts of air from entering the housing and will tend to keep the air within the housing in a more or less quiescent condition. The lamp within the housing does not smoke if it is properly trimmed and all smoke and vapors pass upward and outward through the flue 18. It is obvious that many changes may be made to this device without departing from the spirit of the invention.

Having described my invention, what I claim is:

A lamp housing of the character described comprising a base having an upwardly opening channel extending along each of its side edges, angular corner pieces extending upward from the base having their entrant angles facing outward and being disposed inward of the channels in the base and at the meeting ends of said channels, a top resting upon the corner pieces and attached thereto and having a downwardly opening channel on each of the several sides confronting the first named channels and disposed outward of the corner pieces, the adjacent ends of the material forming the channels both of the top and of the base being cut away to thereby provide the channels with open ends, and slidable panels disposed within said channels and forming the sides of the housing, each of said panels being removable or insertible into its corresponding channel independently of any other panel.

In testimony whereof I hereunto affix my signature in the presence of two witnesses.

LENARD P. ELLISON.

Witnesses:
J. M. SMITH,
C. J. KELLEY.